Oct. 25, 1927.
E. W. DAVIS ET AL
LUBRICANT DISPENSING DEVICE
Filed Nov. 8, 1924
1,646,477
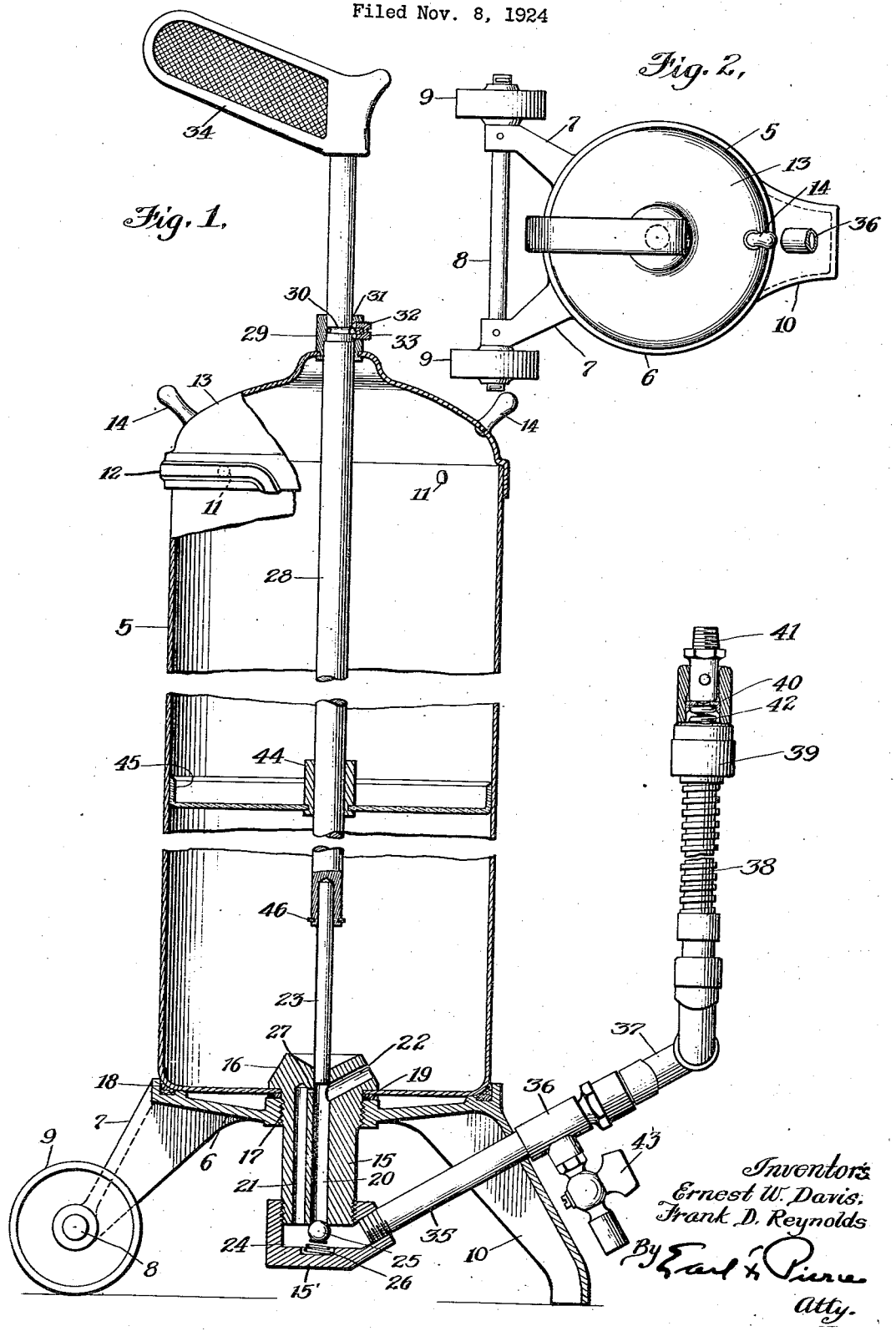
Inventors
Ernest W. Davis,
Frank D. Reynolds
By Earl L. Pierce
Atty.

Patented Oct. 25, 1927.

1,646,477

UNITED STATES PATENT OFFICE.

ERNEST W. DAVIS, OF OAK PARK, AND FRANK D. REYNOLDS, OF HUBBARD WOODS, ILLINOIS, ASSIGNORS TO THE BASSICK MANUFACTURING COMPANY, OF CHICAGO, ILLINOIS, A CORPORATION OF DELAWARE.

LUBRICANT-DISPENSING DEVICE.

Application filed November 8, 1924. Serial No. 748,637.

Our invention relates to improvements in lubricant dispensing devices and is particularly concerned with the provision of a novel type of dispensing device for supplying lubricant, under high pressure, to bearings to be lubricated.

The objects of our invention are:

First, to provide a lubricant compressor capable of holding a comparatively large quantity of lubricant and embodying means whereby the lubricant can be discharged under high pressure;

Second, to provide a lubricant dispensing device, of the character described, mounted upon casters, rollers or other similar antifriction means, whereby it can be easily moved from place to place;

Third, to provide a compressor, such as described, in which a single handle is used for placing the lubricant under pressure and for moving the device from place to place;

Fourth, to provide a lubricant compressor embodying means for placing the lubricant under high pressure and a discharge conduit for conducting the lubricant to the bearings, the discharge conduit having means including a pressure actuated sealing member for making fluid-tight connections with the bearings to be lubricated. In the preferred form of our invention, simple means for relieving the pressure on the lubricant in the discharge conduit are provided, so as to enable the coupling member to be uncoupled from the bearing.

Fifth, to provide a lubricant compressor, such as described, in which common means are used for placing the lubricant under high pressure and for relieving the pressure upon the lubricant; and Sixth, to provide a compressor, such as described, that is simple in construction, economical to manufacture and easy to operate.

Other objects of our invention will appear as this description progresses, reference being had to the accompanying drawings, in which Figure 1 is a longitudinal section of our improved dispensing device; and Figure 2 is a plan view.

Referring to the drawings, our improved compressor comprises the lubricant receptacle 5, mounted upon the base 6. The base 6 comprises the two brackets 7 that are supported by the axle or shaft 8. This shaft is in turn supported by the rollers 9. A foot 10, formed integrally with the side of the base, opposite the brackets 7, provides means for holding the receptacle in an upright position.

The upper end of the receptacle 5 has several bosses 11 pressed outwardly to be received by bayonet slots, or grooves, 12 pressed in the flange of the cap 13. Handles 14, secured to the cap, provide means whereby it may easily be secured to or removed from the receptacle to permit the latter to be filled.

A body member 15, having the head 16, passes through aligned central openings in the base 6 and the bottom of the receptacle 5, and has threaded connection with the base, as shown at 17. When the receptacle, the base and the body member are assembled, as shown in Figure 1, the head 16 clamps the bottom of the receptacle to the base. If desired, suitable gaskets 18 and 19 may be employed for preventing the escape of lubricant between the base and the bottom of the receptacle.

Two parallel bores 20 and 21 are formed in the body member 15 and extend longitudinally thereof. The first of these bores communicates with the receptacle 5 through the port 22 and forms a high pressure cylinder in which the plunger 23 reciprocates. The body member 15 includes the removable cap portion 15', between which and the part 15 is formed a valve chamber 24. The lower end of the bore 21 has free communication with the valve chamber 24 and the high pressure cylinder 20 also communicates with the valve chamber 24; but this communication is controlled by the check valve 25 that opens outwardly against the tension of the compression spring 26. The upper end of the bypass bore 21 communicates with the upper end of the cylinder 20, through the restricted port 27.

The plunger 23 is carried by the plunger rod 28 that extends outwardly through the sleeve 29, secured in the cap 13. A groove 30 is formed in the upper end of the plunger rod 28 for receiving the ball 31. This ball is yieldingly held in engagement with the walls of the groove 30 by means of the spring 32 confined in the cylindrical cage 33. The means just described are used for holding the plunger rod 28 in its uppermost position. The outer end of this plunger rod is provided with a suitable handle 34, preferably of the pistol grip type.

A discharge conduit, comprising a short section of pipe 35, the T union 36, a universal swivel 37, such as described in the copending application of Ernest W. Davis, Serial No. 666,722, filed October 5, 1923, the flexible conduit 38 and the coupling member 39, communicates with the valve chamber 24, the inner end of the pipe section 35 being screwed into the cap member 15' for this purpose, as shown in Figure 1.

The coupling member 39 may be similar in construction to that disclosed in the copending application of James H. Frier, Jr., Serial No. 502,544, filed September 22, 1921, and comprises the cup leather 40 that is held against the end of a fitting 41, for receiving lubricant, by the tension of the spring 42 and the pressure of the lubricant. If desired, a petcock 43 may be connected with the T union 36 for relieving air from the discharge conduit in the event that it collects there in sufficient volume to interfere with the operation of the compressor.

A piston, comprising the sleeve 44 and the flanged disc 45, is slidably mounted upon the plunger rod 28. A ring 46, set into the lower end of the plunger rod 28, can be caused to engage the lower end of the sleeve 44 so as to enable the piston 45 to be removed from the receptacle 5 to enable the latter to be filled.

In the use of my improved compressor, the receptacle 5 is first filled with lubricant and then the plunger 23, plunger rod 28, cap 13 and piston 45 are replaced, as indicated, in such manner that the lower end of the plunger 23 is received in the upper end of the high pressure cylinder. The operator can then, by reciprocating the plunger, first displace the contents from the high pressure cylinder 20 into the valve chamber 24 and then, upon moving the plunger in an upward direction, cause a vacuum to be formed in the high pressure cylinder. Atmospheric pressure being exerted upon the outer face of the piston 45 will cause the latter to move downwardly, thereby displacing lubricant from the receptacle 5 through the port 22 into the cylinder 20. When the pump is first placed in operation, the lubricant discharged from the high pressure cylinder will flow into the valve chamber 24, the bypass 21 and into the discharge conduit.

When, through continued operation of the compressor, the discharge conduit has been completely filled, and when the coupling member 39 has been attached to a fitting, the downward movement of the plunger 23 will cause a charge of lubricant to be forced into the inner end of the discharge conduit and a corresponding quantity of lubricant to be forced through the coupling member into the fitting 41. The initial upward movement of the plunger 23 will cause the valve 25 to be seated against the lower end of the high pressure cylinder 20 so as to prevent the return flow of lubricant into the high pressure cylinder. As the plunger moves upwardly to its initial position, a vacuum will be created in the high pressure cylinder, and when the port 22 is uncovered, this vacuum will, as described above, cause lubricant to be brought into the high pressure cylinder 20.

Just before the end of the return stroke, the plunger 23 uncovers the port 27 that establishes communication between the bore 21 and the high pressure cylinder, and thereby causes the relief of pressure on the lubricant in the discharge conduit, because if this lubricant is under pressure it tends to spread rearwardly through the valve chamber 24, the passageway 21 and the port 27 into the high pressure cylinder. If this cylinder has already been filled with lubricant, the lubricant discharged through the port 27 will cause a similar discharge of lubricant through the port 22 into the receptacle 5. In this manner, each time the plunger is moved to the position shown in Figure 1, the pressure on the lubricant in the discharge conduit is relieved so as to make it possible for the operator to disconnect the coupling member 39 from the fitting 41. The fitting 41 is of a construction well known to those skilled in this art and need not be described in detail.

The port 27 is of such small cross section that the discharge of lubricant from the passageway 21 into the high pressure cylinder through the port 27 is small as compared with the passage of lubricant from the receptacle 5 through the port 22 into the high pressure cylinder 20.

While we have described the details of construction of the preferred form of our invention, it is to be clearly understood that our invention is not limited to these details of construction, but is capable of other adaptations and modifications within the scope of the appended claims.

Having thus described our invention, what we claim is:

1. A lubricant dispensing device comprising a base, rollers for supporting said base, a lubricant receptacle mounted upon said base, a body member threaded into said base and having a head for clamping said receptacle to said base, said body member having a valve chamber in its lower end and two parallel bores formed therein, the first of said bores forming a high pressure cylinder, said body member having a port adjacent its upper end for establishing communication between said high pressure cylinder and said lubricant receptacle, an outwardly opening check valve closing the lower end of said high pressure cylinder, the second of said parallel bores being in free communication with said valve chamber and communicating with the upper end of said high pressure cylinder through a restricted port, a discharge conduit communicating with said valve chamber and terminating in a coupling member, comprising a lubricant-pressed gasket, a removable cover for said lubricant receptacle, a plunger rod reciprocably mounted in said cover and having a plunger portion reciprocable in said high pressure cylinder, a handle on the outer end of said plunger rod whereby said plunger can be reciprocated and said dispensing device pushed from place to place, and a piston slidably mounted upon said plunger rod.

2. A lubricant dispensing device comprising a base, rollers for supporting said base, a lubricant receptacle mounted upon said base, a body member having a head for clamping said receptacle to said base, said body member having a valve chamber in its lower end and two parallel bores formed therein, the first of said bores forming a high pressure cylinder, said body member having a port for establishing communication between said high pressure cylinder and said lubricant receptacle, an outwardly opening check valve closing the lower end of said high pressure cylinder, the second of said parallel bores being in free communication with said valve chamber and communicating with said high pressure cylinder, a discharge conduit communicating with said valve chamber and terminating in a coupling member, comprising a lubricant-pressed gasket, a cover for said lubricant receptacle, a plunger rod reciprocably mounted in said cover and having a plunger portion reciprocable in said high pressure cylinder, a handle on the outer end of said plunger rod whereby said plunger can be reciprocated and said dispensing device pushed from place to place, and a piston slidably mounted upon said plunger rod.

3. A lubricant dispensing device comprising a base, rollers for supporting said base, a lubricant receptacle mounted upon said base, a body member having a valve chamber in its lower end and two parallel bores formed therein, the first of said bores forming a high pressure cylinder, said body member having a port for establishing communication between said high pressure cylinder and said lubricant receptacle, a valve closing the lower end of said high pressure cylinder, the second of said parallel bores being in free communication with said valve chamber and communicating with said high pressure cylinder, a plunger rod having a plunger portion reciprocable in said high pressure cylinder, a handle on the outer end of said plunger rod whereby said plunger can be reciprocated and said dispensing device pushed from place to place, and a piston slidably mounted upon said plunger rod.

4. A lubricant dispensing device comprising a base, a roller for supporting said base, a receptacle mounted on said base, a high pressure cylinder communicating with said receptacle, a check valve yieldingly closing the discharge end of said cylinder, a plunger rod extending out through one end of said cylinder and serving as a valve for closing the inlet end of said high pressure cylinder, a handle secured to the outer end of said plunger rod for reciprocating said plunger and moving said dispensing device from place to place, a discharge conduit communicating with said high pressure cylinder and terminating in a pressure sealed coupling, and a bypass passageway between said discharge conduit and the intake end of said high pressure cylinder, a portion of said bypass being of restricted cross-section.

5. A lubricant dispensing device comprising a roller, a receptacle mounted on said roller, a high pressure cylinder communicating with said receptacle, a check valve yieldingly closing the discharge end of said cylinder, a plunger reciprocable in said high pressure cylinder, a plunger rod extending out through one end of said cylinder, a handle secured to the outer end of said plunger rod for reciprocating said plunger and moving said dispensing device from place to place, and a bypass passageway between the discharge end and the intake end of said high pressure cylinder, a portion of said bypass being of restricted cross-section.

6. A lubricant dispensing device comprising a lubricant receptacle, a high pressure cylinder having an inlet port communicating with said receptacle, plunger means for expelling the contents of said cylinder, a valve chamber at the discharge end of said cylinder, a valve closing the discharge end of said cylinder in position to lie close to said plunger means at the end of its stroke, and a bypass for establishing communication between said valve chamber and said cylinder at a point adjacent the inlet port of said cylinder.

7. A lubricant dispensing device comprising a lubricant receptacle, a high pressure cylinder having an inlet port communicating with said receptacle, plunger means for expelling the contents of said cylinder, a valve chamber at the discharge end of said cylinder, a valve seating on the discharge end of said cylinder in position to lie close to said plunger means at the end of its stroke, and a bypass for establishing communication between said valve chamber and said cylinder.

In witness whereof, we hereunto subscribe our names this 28th day of October, 1924.

ERNEST W. DAVIS.
FRANK D. REYNOLDS.